US00RE49694E

(19) United States
(12) Reissued Patent
Post

(10) Patent Number: US RE49,694 E
(45) Date of Reissued Patent: Oct. 17, 2023

(54) SANDAL

(71) Applicant: Birkenstock IP GmbH, Linz (DE)

(72) Inventor: Uta Post, Cologne (DE)

(73) Assignee: BIRKENSTOCK IP GMBH, Linz am Rhein (DE)

(21) Appl. No.: 29/803,430

(22) Filed: Aug. 12, 2021

Related U.S. Patent Documents

Reissue of:
(64) Patent No.: Des. 855,950
Issued: Aug. 13, 2019
Appl. No.: 35/503,896
Filed: Oct. 12, 2017

(51) LOC (14) Cl. ..... 02-04
(52) U.S. Cl.
USPC ..... D2/916
(58) Field of Classification Search
USPC ..... D2/896–900, 902–908, 916–918, 946, D2/951, 969, 972–974
CPC ..... A43B 3/10; A43B 3/12
See application file for complete search history.

(56) References Cited

U.S. PATENT DOCUMENTS 3,063,457 A * 11/1962 Bittner ..... A43B 7/145 D2/916
D268,455 S * 4/1983 Famolare, Jr. ..... D2/918
D275,429 S * 9/1984 Nakao ..... D2/918
D294,076 S * 2/1988 Birrittella ..... D2/918
5,465,506 A * 11/1995 Matis ..... A43C 11/00 D2/916

(Continued)

OTHER PUBLICATIONS

Birkenstock, "Arizona", https://www.birkenstock.com/us/arizona-birko-flor-nubuck/arizona-core-birkoflornubuck-0-eva-u_650.html#lang=en_US&q=arizona; available at least as early as Oct. 11, 2016; date accessed Sep. 20, 2022.

(Continued)

*Primary Examiner* — Darlington Ly
(74) *Attorney, Agent, or Firm* — Fross, Zelnick, Lehrman & Zissu PC; Charles T. J. Wiegell, Esq.

(57) CLAIM

The ornamental design for a sandal, shown and described.

DESCRIPTION

[1. Sandal]
[1.1 : Perspective]
[1.2 : Right]
[1.3 : Left]
[1.4 : Back]
[1.5 : Front]
[1.6 : Top]
[1.7 : Bottom]
*1.1 is a front perspective view of a sandal embodying my new design;*
*1.2 is a right side elevation view thereof;*
*1.3 is a left side elevation view thereof;*
*1.4 is a rear elevation view thereof;*
*1.5 is a front elevation view thereof;*
*1.6 is a top plan view thereof; and*
*1.7 is a bottom plan view thereof.*

1 Claim, 7 Drawing Sheets

Matter enclosed in heavy brackets [ ] appears in the original patent but forms no part of this reissue; matter printed in italics indicates the additions made by reissue.

(AMENDED)

(56) References Cited

U.S. PATENT DOCUMENTS 5,561,919 A * 10/1996 Gill ..... A43B 13/12 36/11.5
D375,615 S * 11/1996 McDonald ..... D2/916
5,687,492 A * 11/1997 Muraoka ..... A43B 5/14 36/11.5
D416,128 S * 11/1999 Kelchak ..... D2/916
6,122,845 A * 9/2000 Menghi ..... A43C 11/16 36/114
6,256,906 B1 * 7/2001 Matis ..... A43B 3/126 36/11.5
D513,838 S * 1/2006 Birkenstock ..... D2/916
D575,942 S * 9/2008 del Biondi ..... D2/916
D576,387 S * 9/2008 del Biondi ..... D2/916
D577,882 S * 10/2008 Little ..... D2/916
8,839,529 B1 * 9/2014 Levy ..... A43B 3/248 24/442
D732,806 S * 6/2015 Maritan ..... D2/916
D747,080 S * 1/2016 Santos ..... D2/927
D781,540 S * 3/2017 Mitchell ..... D2/916
D792,684 S * 7/2017 Gurt ..... D2/916
D801,010 S * 10/2017 Armellin ..... D2/916
D855,950 S * 8/2019 Post ..... D2/916
D874,101 S * 2/2020 Post ..... D2/916
D876,758 S * 3/2020 Brinkhof ..... D2/916
D878,718 S * 3/2020 Post ..... D2/916
D880,116 S * 4/2020 Post ..... D2/916
D919,247 S * 5/2021 Post ..... D2/951
2002/0088141 A1 * 7/2002 Matis ..... A43B 3/128 36/12
2002/0124433 A1 * 9/2002 Pan ..... A43B 3/122 36/11.5
2021/0153596 A1 * 5/2021 Voggenauer ..... A43B 9/00

OTHER PUBLICATIONS

[Online] "Arizona Birko Flor" https://www.birkenstock.com/us/arizona-birko-flor/arizona-magicsnake-birkoflor-0-eva-w.html?dwvar_arizona-magicsnake-birkoflor-0-eva-w_color=817. Retrieved Sep. 15, 2018.*

* cited by examiner

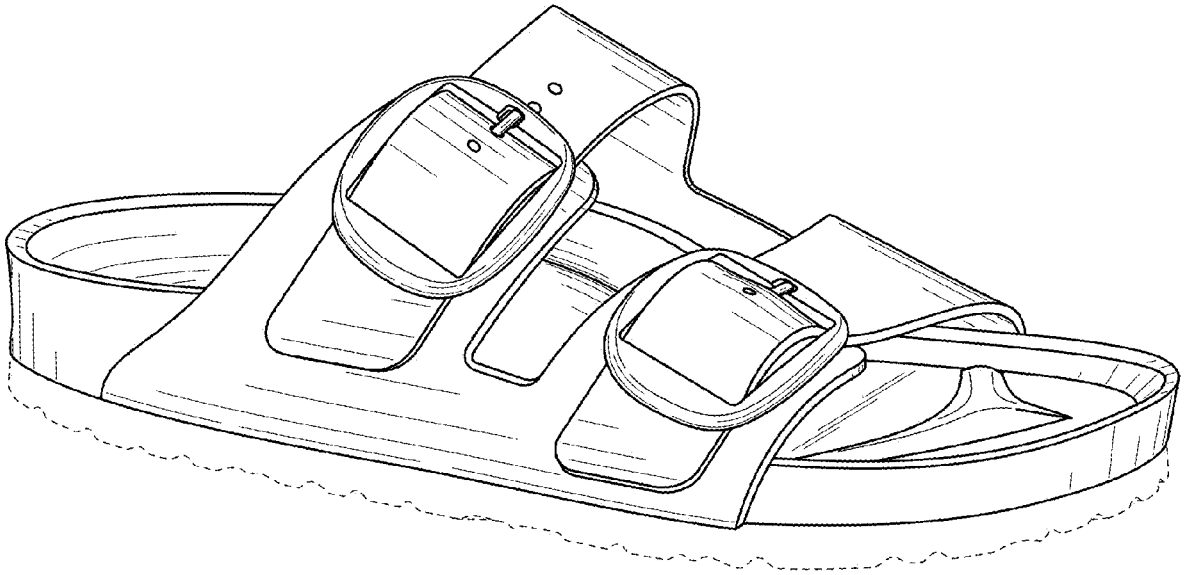
1.1
(AMENDED)

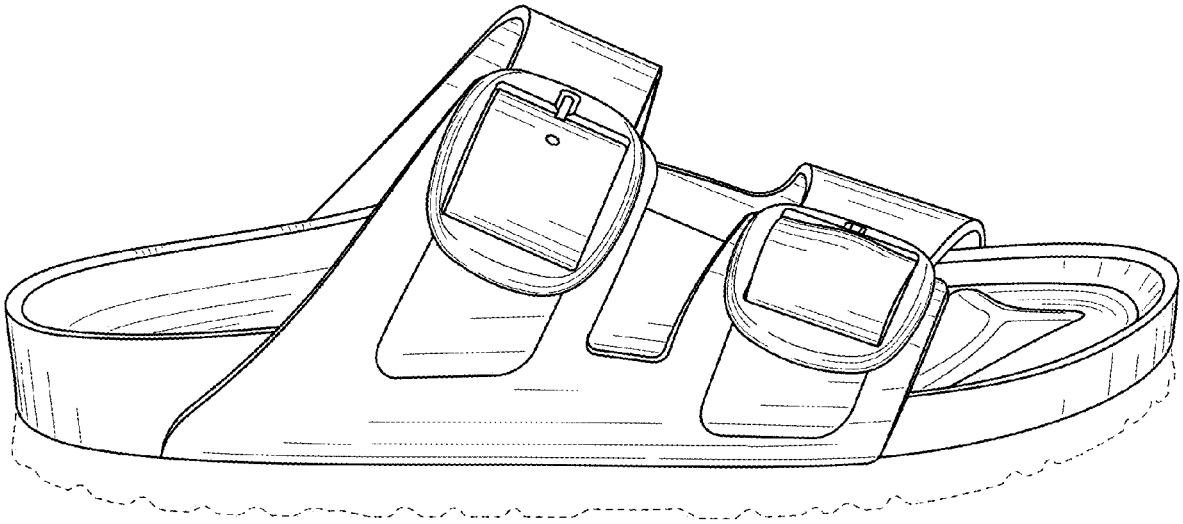
1.2
(AMENDED)

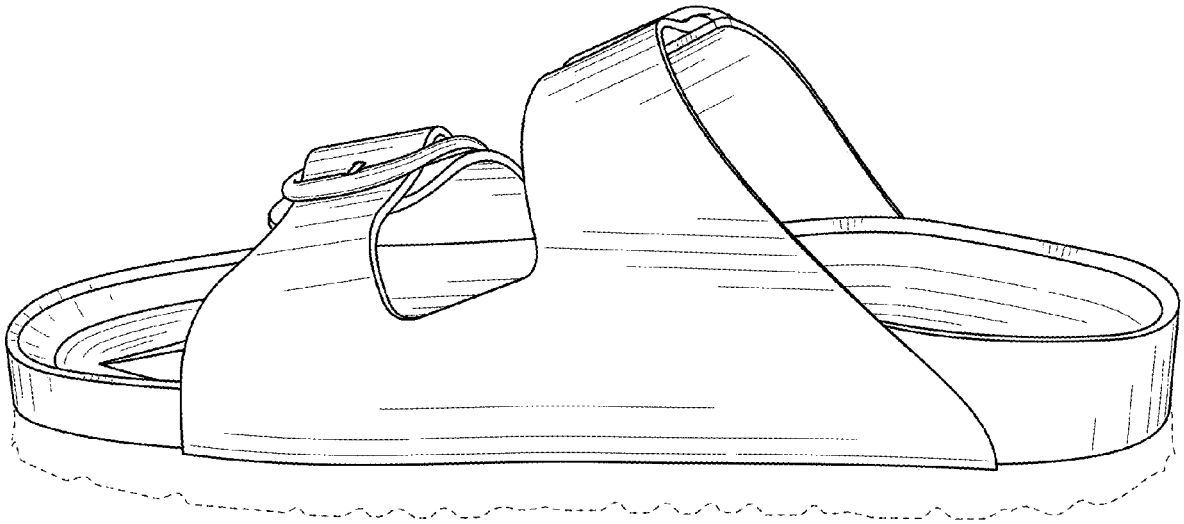
1.3
(AMENDED)

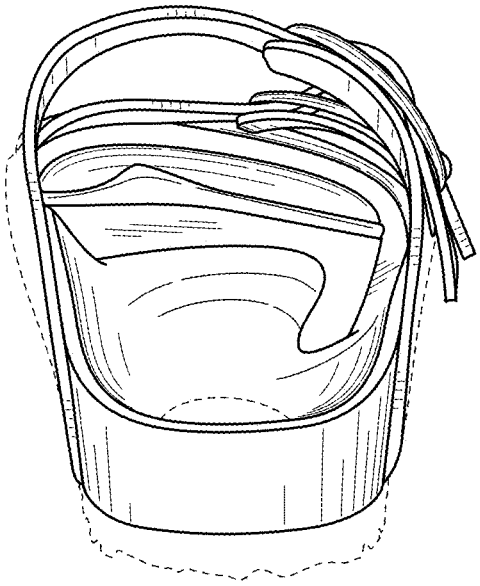
1.4
(AMENDED)

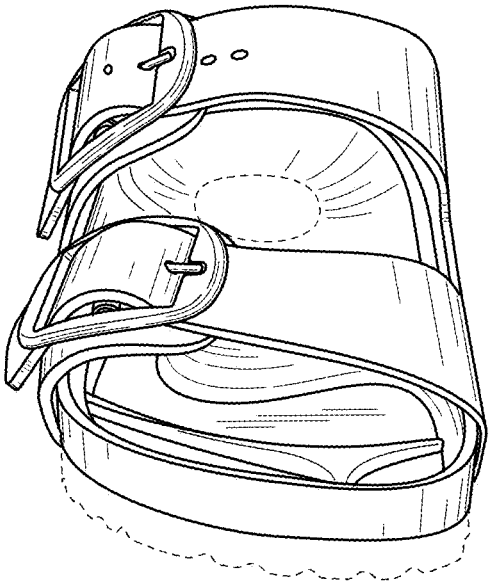
1.5
(AMENDED)

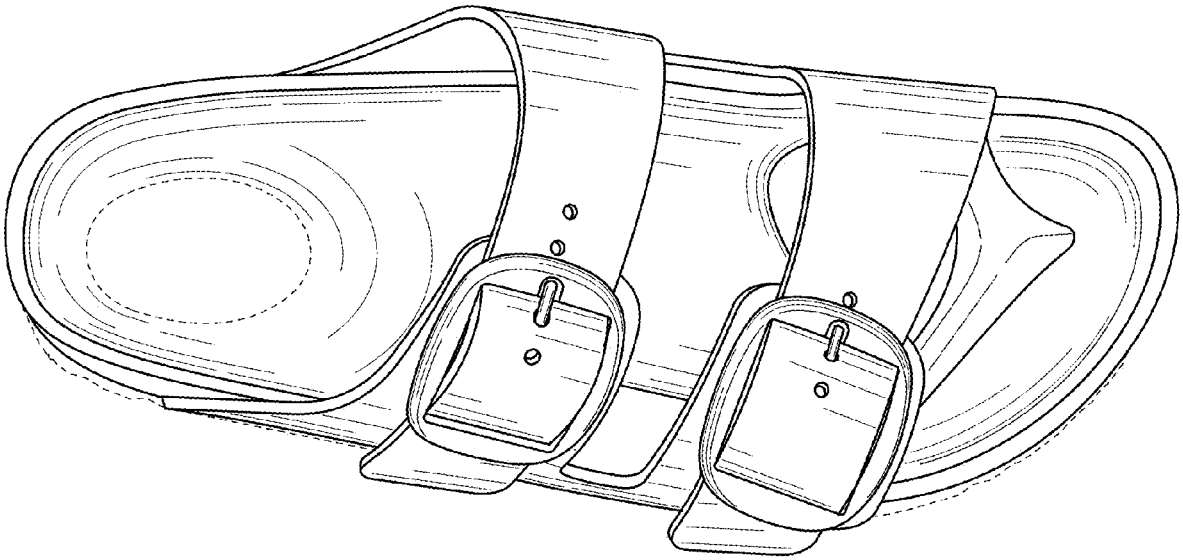
1.6
(AMENDED)

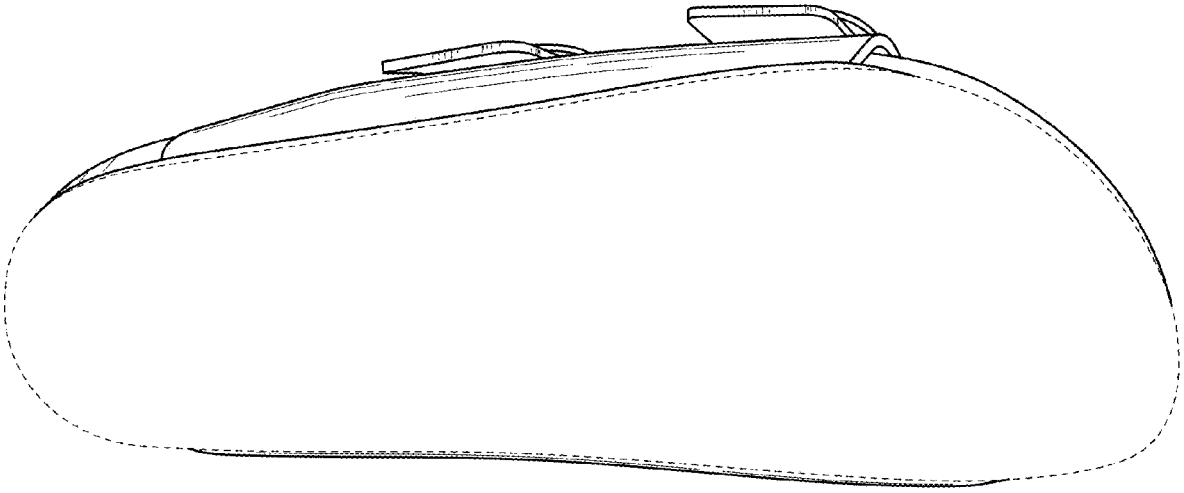
1.7
(AMENDED)